United States Patent
Baumann

(10) Patent No.: US 7,872,390 B2
(45) Date of Patent: Jan. 18, 2011

(54) METHOD FOR MANUFACTURING A CONDUCTOR BAR OF A ROTATING ELECTRICAL MACHINE AND A CONDUCTOR BAR MANUFACTURED ACCORDING TO THIS METHOD

(75) Inventor: Thomas Baumann, Wettingen (CH)

(73) Assignee: Alstom Technology Ltd, Baden (CH)

( * ) Notice: Subject to any disclaimer, the term of this patent is extended or adjusted under 35 U.S.C. 154(b) by 187 days.

(21) Appl. No.: 12/019,849

(22) Filed: Jan. 25, 2008

(65) Prior Publication Data

US 2008/0179984 A1   Jul. 31, 2008

(30) Foreign Application Priority Data

Jan. 25, 2007   (CH) ..................... 0122/07

(51) Int. Cl.
*H02K 3/04* (2006.01)
*H02K 3/30* (2006.01)
*H01B 7/00* (2006.01)

(52) U.S. Cl. .................... 310/201; 310/208; 174/120 R

(58) Field of Classification Search ................ 310/201, 310/196, 215, 208; 174/120 R; 29/596
See application file for complete search history.

(56) References Cited

U.S. PATENT DOCUMENTS

| | | | |
|---|---|---|---|
| 5,945,764 A | 8/1999 | Bendfeld et al. | |
| 6,288,341 B1 | 9/2001 | Tsunoda et al. | |
| 6,404,092 B1 | 6/2002 | Baumann et al. | |
| 6,656,317 B2 * | 12/2003 | Hudson ...................... | 156/294 |
| 6,836,204 B2 * | 12/2004 | Reid et al. ................... | 336/206 |
| 7,268,293 B2 * | 9/2007 | Smith et al. .................... | 174/36 |
| 2004/0056550 A1 * | 3/2004 | Grundl et al. ................ | 310/187 |
| 2005/0016665 A1 | 1/2005 | Hudson | |

FOREIGN PATENT DOCUMENTS

| | | |
|---|---|---|
| DE | 19811370 | 9/1999 |
| EP | 0951132 | 10/1999 |
| EP | 1319266 | 6/2003 |
| GB | 2406721 | 4/2005 |

* cited by examiner

*Primary Examiner*—Quyen Leung
*Assistant Examiner*—Eric Johnson

(57) ABSTRACT

A method for manufacturing a conductor bar of a rotating electrical machine includes providing a conductor defining a longitudinal direction and having a rectangular cross section, and building up an insulation to a thickness d around the conductor by progressively winding an insulating tape around the conductor a plurality of times in the form of a spiral in the longitudinal direction. The building up of the insulation includes winding the insulation tape around the conductor using parallel winding up to a first partial thickness, and winding the insulating tape around the conductor using non-parallel winding from the first partial thickness.

10 Claims, 2 Drawing Sheets

METHOD FOR MANUFACTURING A CONDUCTOR BAR OF A ROTATING ELECTRICAL MACHINE AND A CONDUCTOR BAR MANUFACTURED ACCORDING TO THIS METHOD

Priority is claimed to Swiss Patent Application No. CH 001122/07, filed on Jan. 25, 2007, the entire disclosure of which is incorporated by reference herein.

The present invention relates generally to the field of rotating electrical machines, and more particularly to a method for manufacturing a conductor bar of a rotating electrical machine and a conductor bar manufactured according to this method.

BACKGROUND

In the case of high-power rotating electrical machines, the associated windings are formed by conductor bars laid in slots of a sheet steel body. The conductor bars have a central metallic conductor (usually consisting of a plurality of partial conductors made from drawn copper wire with predominantly rectangular cross section). The conductor bars likewise have a predominantly rectangular cross section and are surrounded by an insulation of defined thickness (see, for example, publications DE-A1-198 11 370 or EP-B1-1 319 266). The insulation is frequently constructed by winding a glass/mica tape several times around the conductor, said tape being impregnated with artificial resin in order to remove air pockets and for strengthening.

These days, glass/mica tapes are applied almost exclusively by machine using special winding robots. In doing so, the rolls of tape are moved in a rotating ring along the longitudinal direction of the bar and the tape is wound on in several layers with about 50% overlap in the form of a spiral until the required thickness is reached.

A distinction is made between different winding methods, which are referred to as "parallel winding" and "cross winding":

Parallel winding: Winding is always carried out in one direction only (see FIG. 2). All tape edges of different tape layers or winding layers lie parallel to one another. The disadvantage here is that when a layer has been completed, the winding ring must be returned "empty", which means lost time within the manufacturing process.

Cross winding: Here, winding is carried out backwards and forwards in alternate directions (see FIG. 3). As a result, the alignment of the edges of tapes of two successive layers reverses (in a similar way to a bandage on a wound). This is the method of winding used almost exclusively today. A disadvantage of cross winding is that, without considerable effort, it cannot be avoided that at some point in time the crossing points of two tape layers come to lie on an edge of the conductor.

SUMMARY OF THE INVENTION

These crossing points (16 in FIG. 3) may be looked upon as weaknesses in the insulation. They form a channel in the direction of the electric field and when this also occurs at a point where the field strength is increased (as is the case at the edge in the vicinity of the copper conductor in particular), then this may be considered as a "predetermined breaking point" for electrical breakdown.

In fact, it has been shown that the life of cross-wound insulation with crossing points on the edge is only 25% of that of an insulation with crossing points on the broad side. For the latter, the life is approximately the same as for the parallel winding.

It is an object of the present invention to specify a winding method in the manufacture of conductor bars, which makes it possible to combine the dielectric advantages of the parallel winding with the economic advantages of the cross winding, and to create a corresponding conductor bar.

An aspect of the invention is that the insulating tape is wound around the conductor using a parallel winding up to a first partial thickness, and that the insulating tape is wound around the conductor from the first partial thickness using a second winding method, which differs from the parallel winding. By this means, the uneconomical parallel winding can be limited to a necessary partial range while it is possible to resort to simpler winding methods, such as the cross winding, in the remaining range.

An embodiment of the invention is distinguished in that from the first partial thickness the insulating tape is wound around the conductor in the second winding process until the full thickness d of the insulation is reached.

Advantageously, a glass/mica tape is used here as the insulating tape.

Another embodiment is characterized in that the insulating tape is wound around the conductor with an overlap of about 50%.

A further embodiment of the method according to the invention is distinguished in that, in the second winding method, successive layers of the insulating tape are wound around the conductor in alternate directions in the manner of a cross winding.

Preferably, that thickness at which the field strength at one edge of the conductor is equal to the nominal field strength on a broad side of the conductor is chosen as the first partial thickness.

An embodiment of the conductor bar according to the invention is characterized in that the insulating tape is a glass/mica tape, that successive layers of the insulating tape are wound around the conductor from the first partial thickness to the full thickness d of the insulation in alternate directions in the manner of a cross winding, and that the first partial thickness is that thickness at which the field strength at one edge of the conductor is equal to the nominal field strength on a broad side of the conductor.

BRIEF DESCRIPTION OF THE DRAWINGS

The invention is explained in more detail below with reference to exemplary embodiments in conjunction with the drawings, in which.

DETAILED DESCRIPTION

Figure 1:
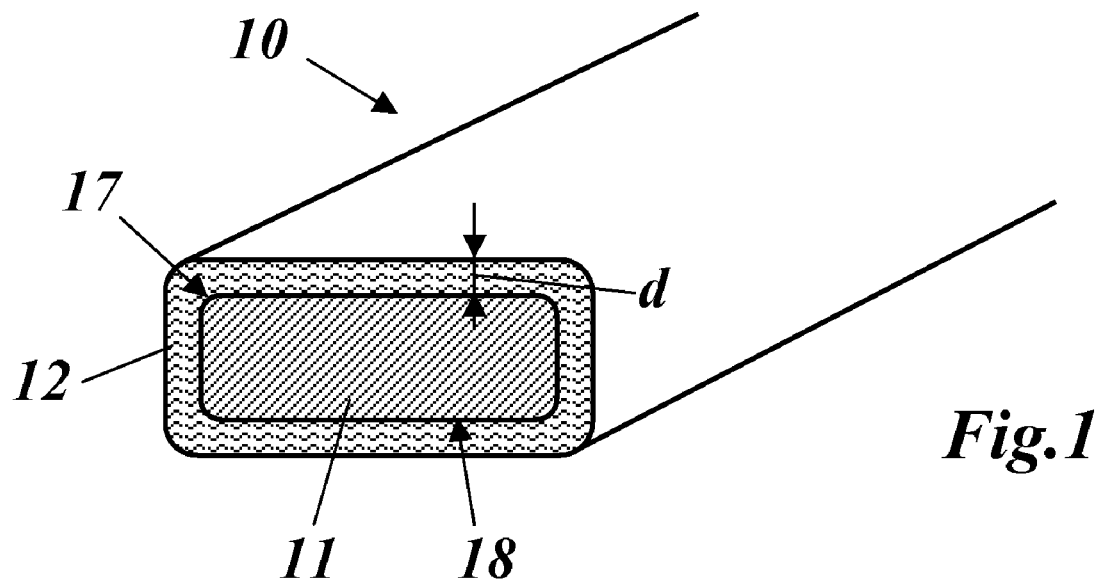
FIG. 1 shows in a perspective view the typical construction of a conductor bar of rectangular cross section, which is the basis of the invention.

According to FIG. 1, the invention starts from a conductor bar 10 with essentially rectangular cross section and the associated edges 17. The conductor bar 10 has a central conductor 11 (e.g. made of copper), which can also be made up of several partial conductors. The conductor 11 is surrounded by an insulation 12 of thickness d. The insulation 12 is formed by winding multiple layers of an insulating tape 13 (FIGS. 2 and 3), preferably in the form of a glass/mica tape, around the conductor 11.

Figure 2:
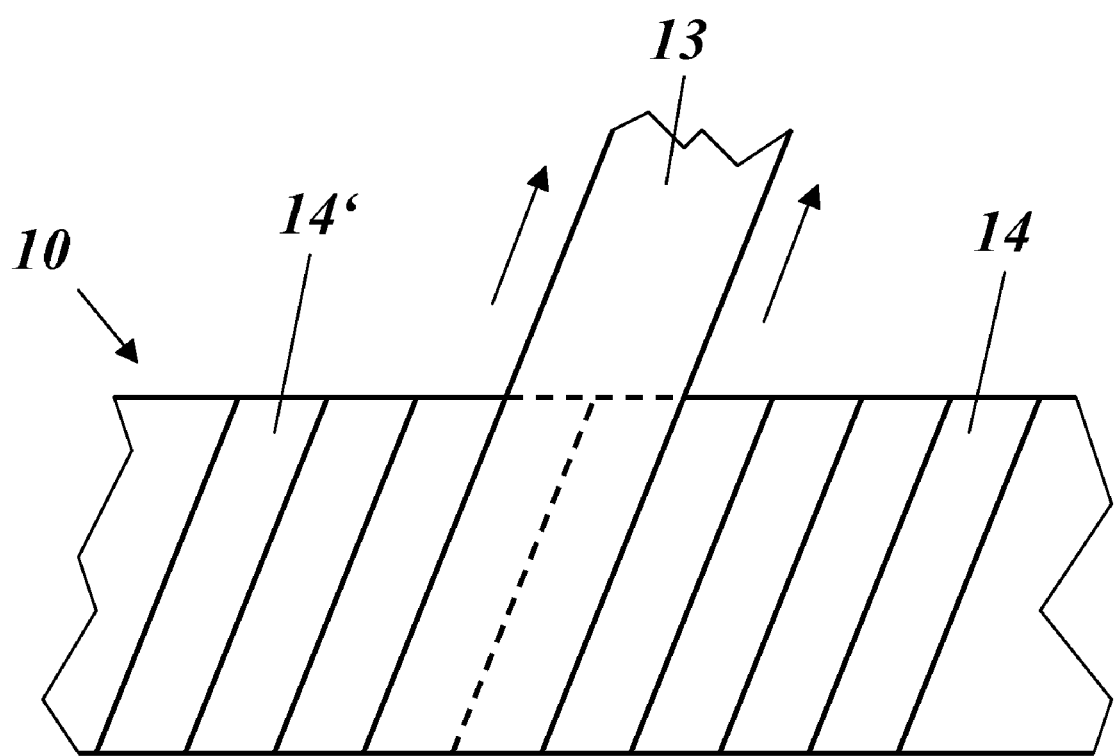
FIG. 2 shows in a side view the winding schematic when constructing a parallel winding.

FIG. 2 shows schematically a winding method described as parallel winding in which the insulating tape 13 is always progressively wound around the conductor in the same direction. Here, the tape edges of successive winding layers 14 and 14' lie parallel to one another. The overlap here is about 50%.

Figure 3:
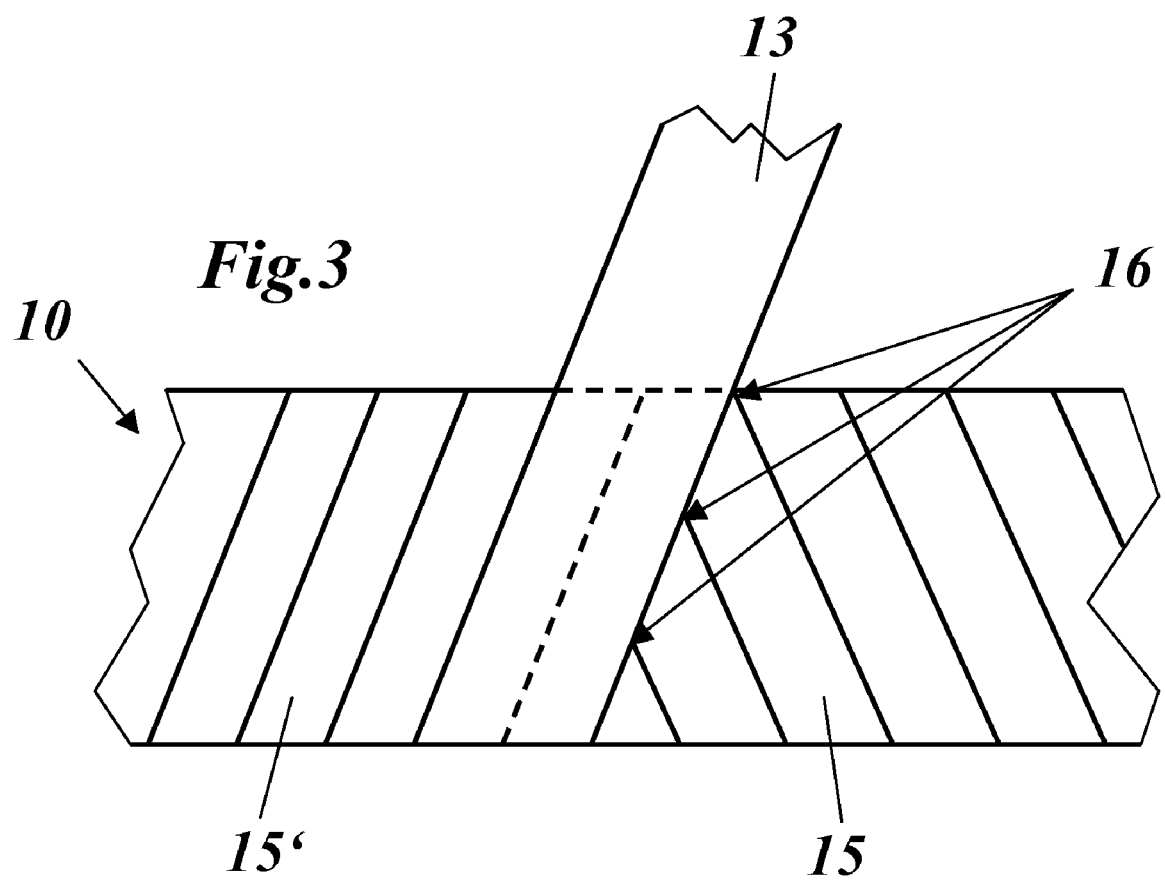
FIG. 3 shows in a side view the winding schematic when constructing a cross winding.

FIG. 3 shows schematically a winding method described as cross winding in which the insulating tape 13 is progressively wound around the conductor in alternate directions in successive winding layers 15, 15'. Here, the tape edges of successive winding layers 15 and 15' cross one another at certain crossing points 16, which can easily lie directly on one of the edges 17.

According to the new solution, when winding the insulating tape 13 around the conductor 11, the bottommost layers are now executed in parallel winding up to a first partial thickness (FIG. 2). From the first partial thickness a change is made to cross winding (FIG. 3). The point of the "first partial thickness" is decisive. This should be chosen so that at this point the electric field E(s) at the edge 17, which is dependent on the distance s from the edge, at the associated distance $s_i$ from the edge 17 is equal to the electric field $E_n$ on the broad side 18 of the conductor 11. The latter is given by $E_n=U_n/(d\cdot\sqrt{3})$ for a nominal voltage $U_n$, while the field E at the edge 17 as a function of the distance s from the edge 17 (edge radius=$r_i$, insulation thickness=d) is given approximately by $$E_s = \frac{U_m}{\sqrt{3}\cdot(r_i+s)\cdot\ln[(r_i+d)/r_i]}$$

Figure 4:
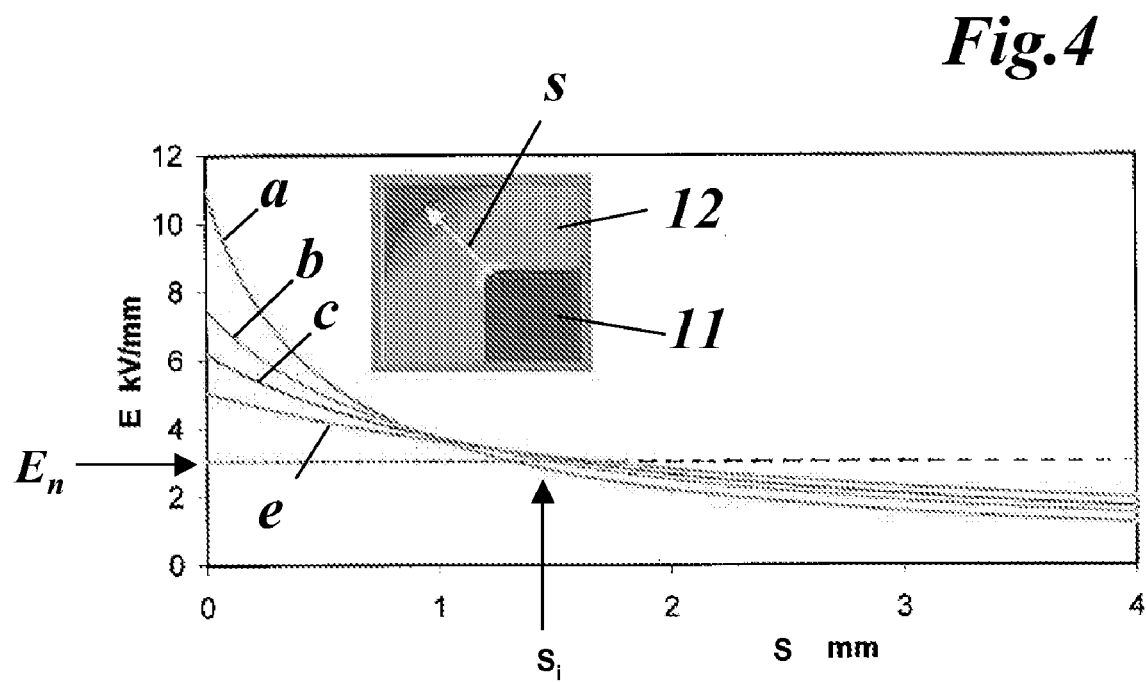
FIG. 4 shows in a diagram the field strength in the vicinity of the edge of the conductor bar (inserted section of the picture) as a function of the distance (s) from the edge for different radii of curvature of the edge at a rated voltage $U_n$ of 21 kV and an insulation thickness d of 4 mm.

The curves for E(s) are reproduced in FIG. 4 for $U_n$=21 kV, insulation thickness d=4 mm and for different radii of curvature of the edge 17 (Curve a: r=0.5; Curve b; r=1.0; Curve c: r=1.5; and Curve e: r=2.5). The distance from the edge $s_i$ at which $E(s)=E_n$, lies between 1.3 and 1.7 mm depending on the edge radius.

It is expedient to execute the insulation 12 in parallel winding up to the partial thickness corresponding to this distance from the edge $s_i$. However, from this partial thickness, parallel winding is absolutely unnecessary and the more favorable cross winding can be used.

As a rule of thumb, the first third or the first 40% of the tape layers should be applied in parallel winding, and cross winding used for the rest of the thickness.

What is claimed is:

1. A method for manufacturing a conductor bar of a rotating electrical machine, the method comprising:

providing a conductor defining a longitudinal direction and having a rectangular cross section; and building up an insulation to a thickness d around the conductor by progressively winding an insulating tape around the conductor a plurality of times, wherein the building up of the insulation includes:

winding the insulation tape around the conductor so as to form a first plurality of layers using parallel winding up to a first partial thickness; and winding the insulating tape around the conductor so as to form a second plurality of layers using cross winding from the first partial thickness.

2. The method as recited in claim 1, wherein the cross winding is performed until the insulation reaches the thickness d.

3. The method as recited in claim 1, wherein the insulating tape includes a glass/mica tape.

4. The method as recited in claim 1, wherein the progressively winding of the insulating tape around the conductor is performed as to have an overlap of about 50%.

5. The method as recited in claim 1, wherein the first partial thickness is determined as a thickness at which a field strength at one edge of the conductor is equal to a nominal field strength on a broad side of the conductor.

6. A conductor bar for a rotating electrical machine, the conductor bar comprising:

a conductor having a rectangular cross section;

an insulation having a thickness d surrounding the rectangular cross-section, wherein the thickness d includes a first partial thickness of the insulation made up of a first plurality of layers of an insulating tape progressively wound around the conductor so that the tape in each layer is overlapped onto itself, with adjacent layers of the first plurality of layers being disposed in a parallel-wound arrangement and a second partial thickness made up of a second plurality of layers of the insulating tape progressively wound around the first partial thickness so that the tape in each layer is overlapped onto itself, with adjacent layers of the second plurality of layers being disposed in a cross-wound arrangement.

7. The conductor bar as recited in claim 6, wherein the insulating tape is a glass/mica tape.

8. The conductor bar as recited in claim 6, wherein the thickness d is a sum of the first and second partial thicknesses.

9. The conductor bar as recited in claim 6 wherein the first partial thickness is a thickness at which a field strength at an edge of the conductor is equal to a nominal field strength on a broad side of the conductor.

10. The conductor bar as recited in claim 6, wherein the first partial thickness is one-third to 40% of the thickness d of the insulation.

* * * * *